July 28, 1959 — E. O. THOMPSON — 2,896,605
TOOLS
Filed Nov. 7, 1956
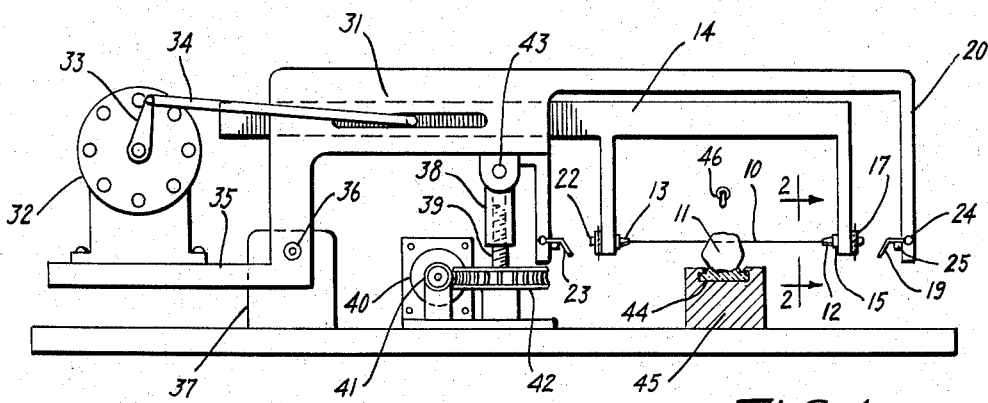
FIG. 1.
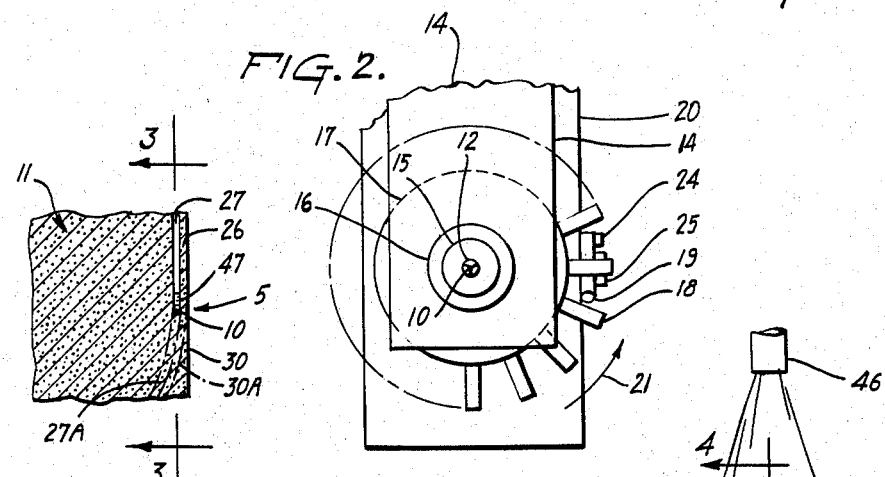
FIG. 2.
FIG. 4.
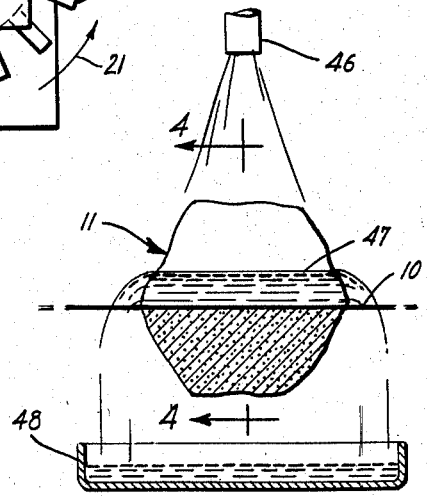
FIG. 3.
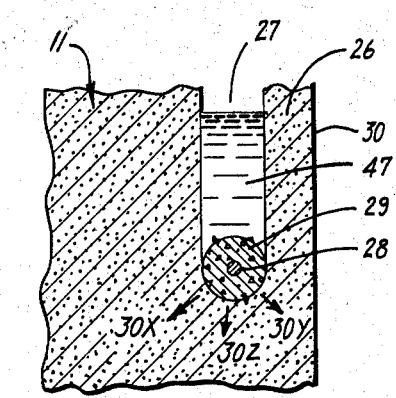
FIG. 5.
INVENTOR.
ELMER O. THOMPSON
BY
AGENT

United States Patent Office 2,896,605
Patented July 28, 1959

2,896,605
TOOLS

Elmer O. Thompson, Meadowbrook, Pa., assignor to Philco Corporation, Philadelphia, Pa., a corporation of Pennsylvania Application November 7, 1956, Serial No. 620,838

4 Claims. (Cl. 125—16)

This invention relates to a tool for producing plane-parallel wafers, blanks or plates from ingots of germanium, silicon, quartz, glass and the like.

Very thin plates or blanks are often required. In addition it is usually desirable to make the cut or kerf as narrow as possible, since the ingots are often made of highly refined and costly material. In an attempt to produce a thin wafer, with a narrow kerf, the art has heretofore employed thin, flat usually disc-shaped abrasive cutter blades, with minute diamond splinters or the like on their edges and on their flat surfaces. However, work with such cutters was both difficult and expensive. The kerf still tended to be wide and it was relatively rough. The plates cut from the ingot had to be unduly thick and such plates were still subject to danger of breakage, during the cutting. Ingot material as well as cutter material was wasted; and various other problems were encountered.

It is a general object of this invention to minimize or eliminate such problems. A particular object is to improve the fabrication of thin crystal wafers and the like by a novel abrasive wire saw design, or sawing method, employed in lieu of the aforementioned cutters.

Former attempts to employ abrasive wire saw cutting, in lieu of the abrasive blade or disc cutting conventional in this field, had led to difficulties which were even more severe than those of the cutter blades or discs, as will be explained hereinafter.

All of the difficulties mentioned have now been overcome, by providing what may generally be called a compound motion of an abrasive wire saw, as will be understood readily upon a study of the disclosure which follows.

In the drawing Figure 1 is a somewhat schematic side view of a machine incorporating the present invention.

Figure 2 is an enlarged detail view taken along line 2—2 of Figure 1.

Figure 3 is an enlarged representation of a tool and workpiece detail, seen in the same view as in Figure 1; the workpiece being seen in section along line 3—3 in Figure 4.

Figure 4 is a view taken along line 4—4 in Figure 3 and further enlarged; and

Figure 5 is a greatly enlarged view of a detail taken from Figure 4, seen in the same view as in that figure and identified in that figure by number 5.

In Figure 1, the saw 10, for the slicing of a crystal 11, is shown as a thin wire, held extended by chuck members 12, 13 at opposite ends of a hacksaw frame 14. The wire has an abrasive surface, which may be generally cylindrical, although it may have suitable "land" and "groove" areas as is known in the abrasive art and not shown herein. Each saw chuck member can be revolved about an axis defined by the wire.

Such rotation may be effected for instance by a simple pawl and spoke wheel mechanism, shown in Figures 1 and 2 as comprising a chuck collar 15 rotatable in a bearing 16 at one end of the frame 14; this collar extending through the bearing and having a star wheel 17 mounted thereon, on the other side of the frame 14. The spokes 18 of this wheel are so disposed, relative to a deflector or pawl 19 on a stationary frame 20, that a terminal part of each reciprocation of the saw, in one direction, causes one of the spokes 18 to ride up an inclined front surface of the deflector. This results in an angular deflection of the spoke 18, wheel 17, collar 16 and chuck 15; and all such deflections can be performed, for instance, in a counterclockwise direction in Figure 2, as shown by arrow 21. Deflection of the opposite spoke wheel 22 by the opposite pawl 23 is then performed in the same angular direction and to the same angular extent, according to the present arrangement, so that opposite ends of the saw 10 are alternately uniformly twisted by small angles, resulting in gradual, complete, bodily rotation of the reciprocating saw.

The deflectors or pawls 19, 23 may allow overriding by the spoke wheel cooperating therewith; reverse actuation of the spoke wheel, on each return stroke, can be avoided. This can be done for instance by mounting each deflector on a pivot 24, in association with a stop member 25, so that the deflector is free on each return stroke to idle while rising from the position shown, but that it causes positive, predetermined deflection of the spoke wheel on each forward stroke. There may be used, for instance, sixteen spokes on each wheel 17, 22, resulting in a gradual, complete rotation of saw 10 during every sixteen forward and backward strokes.

As indicated in Figure 5 the abrasive surface of wire 10 is in broad contact with and exerts lateral as well as downward pressure against the workpiece. This pressure is vibratory. In order to successfully cut in a thin wafer of material from the crystal ingot 10, the saw must apply the least possible lateral pressure against the thin, semi-attached slab 26, exposed on the outside of the kerf 27. Therefore the danger of breakage of thin slabs, in process of formation, is reduced by minimizing the mass of vibratory saw structure, in contact with this slab. This, in turn, is a reason why it is preferable, for the cutting of thin wafers, to utilize thin wire saws. Such a saw may comprise for instance, as shown in Figure 5, a metallic core filament 28, with an abrasive body 29 coaxially bonded thereto. The core 28 may for example consist of high tensile strength drawn tungsten; and a fine-grit diamond-bearing coating may be bonded to this core.

When accurate slicing by abrasive wire saws was heretofore attempted, a very serious difficulty was encountered. Each wafer and each adjacent kerf, instead of being plane-parallel along a flat surface 30 (Figure 4), usually had a curved profile with progressive lateral deflection, as indicated by the broken lines 30A and 27A. The lateral deflection of such curves, relative to the plane 30, was either toward the left as shown or sometimes toward the right. It differed in degree, as well as direction, for different saws; but some curve of deflection was fairly consistently encountered so long as the same saw was used. The deflection was often as great as one-quarter of an inch in the cutting of a crystal of a few inches thickness, when the saw tension was normal or moderate; it was at any rate the equivalent of many times the desired slab thickness of a few mils. Thus the plates, heretofore produced by a saw, could be made about as thin as the saw itself; their surfaces were sufficiently parallel; but they were non-planar to a major extent.

Such plates were practically useless where plane-parallel wafers were required; and while subsequent straightening of the curved surfaces could be achieved on relatively thick wafers or plates, by known etching processes, this would usually involve prohibitive costs, even if etched-off material be recovered.

The curved lateral deflection of the saw has now been avoided, for all practical purposes presently considered. This has been achieved by the progressive, gradual rotation of the saw wire, effected by a spoke wheel and deflector mechanism 18, 19 or the like.

It appears—although I do not wish to be bound to any theory—that in the abrasive surface portion of the saw, sliding over the crystal, individual diamonds tend to cut in vastly different, individual directions 30X, 30Y, etc., Figure 5, and that said abrasive area, accordingly, may be biased into a particular average direction 30Z, more or less different from the vertical. The successive exposures of different abrasive areas, brought about in predetermined ways by the deflector mechanism 18, 19 (not merely left to the abrasive wire and the crystal surfaces themselves), seem to have the effect that the different deviations of said directions 30Z, from a vertical line, will mutually compensate for one another.

This seems to explain the consistent, planar, vertical cutting, which I have obtained with this saw. It further seems to be desirable, for this directional compensation, that means or operations are provided whereby the position of the abrasive wire is shifted incident to the more basically required saw movements.

While the details of the illustrated case, relating to this shifting incident to basic movement, are subject to variation, they have several advantageous features. In the first place, the operation as described involves partly overlapping steps of longitudinal reciprocation and unidirectional rotation; this contributes to speedy cutting. In addition, twisting is applied to each end portion of the wire. This is done, more particularly, at a moment when the length of such end portion, unconfined between workpiece 11 and chuck 12 or 13 and unrestrained for torsional response, is at a maximum; this adds to the safety and smoothness of said response.

I have successfully cut plane-parallel germanium wafers of eight mils thickness with a tolerance of not more than half a mil, from crystals of about two inches diameter. Such cutting was heretofore impossible. I cut each of said wafers by several thousand reciprocations of a fine grit diamond wire saw having about seven inches length and—at least initially—about ten mils effective diameter, revolving once every sixteen reciprocations. I have rapidly produced large numbers of said wafers by each saw wire, constructed and operating as described.

For some added mechanical features, reference may be made once more to Figure 1. It will be seen that the reciprocating saw frame 14 is adapted to slide in a guide portion 31 of the fixed frame 20, in a direction along the axis of the saw wire 10. The frame 14 is shifted back and forth by a motor 32, through the intermediary of a crank 33 and pitman 34; the motor being mounted on a bracket 35 which may be rigid with the frame 20.

The frame 20 may rock on a horizontal pivot pin 36, held by a suitable support 37, so that successive reciprocations of the saw occur in a single vertical plane or in other words, so that the reciprocating saw can gradually move into the crystal 11, transversely of wire 10. This latter movement may be controlled by a screw mechanism 38, 39, actuated by a separate motor 40 through a worm and worm gear drive 41, 42; and such a mechanism may be connected with the frame 20 by pivot means 43.

The crystal 11 may be mounted on a ceramic base 44 horizontally slidable on a support 45; and suitable means, not shown, may be provided for controlling such sliding and for receiving the cut-off wafer at the end of each saw operation.

Coolant liquid may be applied to the working area of the saw 10 through a dispensing nozzle 46 to submerge the operating portion of the saw 10, as best shown in Figures 3 and 5, where the liquid appears at 47. Waste coolant liquid can be intercepted in a pan 48, Figures 3 and 4. The relatively small amounts of germanium, present in such waste liquid as a result of the use of the present invention, can be recovered relatively easily, in a recovery station, not shown. It is necessary only to separate such germanium from the coolant liquid and from relatively small amounts of diamond waste products and the like, contained in said liquid.

In former crystal-slicing processes, by contrast, enormous amounts of germanium or the like were wasted. The cutting discs, in order to minimize vibration, had to be at least about fifteen to twenty mils thick in cases where the present saw can be eight mils thick; this obviously involved the making of a kerf of two to three times the thickness of the wafer. In addition the wafers produced by such twenty mil discs had to be at least about twenty mils thick, themselves, because of surface roughness and of persisting dangers of breakage by the discs; thus involving the necessity of lapping off and etching off more than half of the sliced, raw wafer. Recovery of the large amounts of germanium waste, from solutions full of etching, lapping and disc saw binder materials, and the like, was much less efficient and much more expensive, even on gram by gram basis, than the recovery of the small amounts of kerf waste, from the present coolant solution.

It has further been found that by virtue of the present slicer, lapping of the wafer can be omitted entirely; and most or all of said former etching—mainly the so-called sizing etch—can also be omitted, in most fabrication methods using the present tool.

Still another advantage of the present tool resides in the fact that it allows the growing and use of crystals of practically unlimited size, whereas the former disc cutters were limited to small crystal diameters such as two inches. For a number of known reasons, which need not be developed here, the growing and use of larger crystals is greatly preferred.

While only a single embodiment of the invention has been described, it should be understood that the details thereof are not to be construed as limitative of the invention, except insofar as set forth in the following claims.

I claim:

1. The method of sawing with an abrasive wire which comprises: performing a primary, reciprocatory movement of the wire along the axis thereof; and applying a force to the wire during a predetermined phase of such movement to perform a secondary, intermittent movement of the wire, about the axis thereof.

2. The method of sawing with an abrasive wire which comprises: performing a primary movement of the wire along the axis thereof; and applying a force to the wire to perform secondary movements thereof, alternately at two ends of the wire, each secondary movement being performed at one end while a reciprocation is being completed.

3. The method of making flat, thin wafers which comprises: reciprocating the ends of a thin abrasive wire, tensioned over a workpiece, along successive lines substantially parallel to the wire and which lie in a single plane; and, incident to such reciprocating, applying forces to wire portions not contacting the workpiece, for twisting such portions angularly about the axis of the wire, whereby deviation of the saw kerf from said plane is minimized.

4. In a saw: a thin abrasive wire; holding devices, one for holding each end of the wire; means spacing the holding devices from one another for tensioning the wire over a workpiece; means for reciprocating the spacing means to move the holding devices toward and away from the workpiece and thereby to saw a kerf into the workpiece; and means for turning such holding devices, incident to such reciprocating, so as to twist the wire portions extending between the holding devices and the workpiece.

References Cited in the file of this patent

UNITED STATES PATENTS

| | | |
|---|---|---|
| 125,804 | Gear | Apr. 16, 1872 |
| 1,876,480 | Weinholz et al. | Sept. 6, 1932 |
| 2,328,998 | Radford | Sept. 7, 1943 |
| 2,479,929 | Harris | Aug. 23, 1949 |

FOREIGN PATENTS

| | | |
|---|---|---|
| 15,937 | Switzerland | Dec. 4, 1897 |